(12) United States Patent
Yu et al.

(10) Patent No.: US 9,766,358 B2
(45) Date of Patent: Sep. 19, 2017

(54) SYSTEM AND METHOD FOR LOCAL ATTRIBUTE MATCHING IN SEISMIC PROCESSING

(75) Inventors: Zhou Yu, Katy, TX (US); Imtiaz Ahmed, Katy, TX (US)

(73) Assignee: BP Corporation North America Inc., Houston, TX (US)

(*) Notice: Subject to any disclaimer, the term of this patent is extended or adjusted under 35 U.S.C. 154(b) by 799 days.

(21) Appl. No.: 13/038,234

(22) Filed: Mar. 1, 2011

(65) Prior Publication Data

US 2011/0213556 A1  Sep. 1, 2011

Related U.S. Application Data

(60) Provisional application No. 61/309,291, filed on Mar. 1, 2010.

(51) Int. Cl.
*G01V 1/28* (2006.01)
*G01V 1/36* (2006.01)

(52) U.S. Cl.
CPC .......... *G01V 1/368* (2013.01); *G01V 2210/32* (2013.01)

(58) Field of Classification Search
CPC .......... G01V 1/368; G01V 2210/32
USPC .......... 702/14, 16
See application file for complete search history.

(56) References Cited

U.S. PATENT DOCUMENTS

2008/0221801 A1* 9/2008 Craft et al. .......... 702/17
2010/0039894 A1* 2/2010 Abma .......... 367/52
2010/0186950 A1* 7/2010 Neelamani et al. .......... 166/250.01

OTHER PUBLICATIONS

Z. Yu et al., Seismic Noise Attenuation Using 2D Complex Wavelet Transform, Jun. 12 2008, pp. 1-7.*

(Continued)

*Primary Examiner* — John Breene
*Assistant Examiner* — Yaritza H Perez Bermudez
(74) *Attorney, Agent, or Firm* — K. KaRan Reed

(57) ABSTRACT

There is provided herein a new system and method of local attribute match filtering which operates in the local attribute domain via the use of complex wavelet transform technology. This approach is adaptable to address various noise types in seismic data and, more particularly, is well suited to reduce the noise in geophone data as long as an associated hydrophone signal is relatively noise-free.

30 Claims, 5 Drawing Sheets

(56) References Cited

OTHER PUBLICATIONS

PCT International Search Report and Written Opinion of the International Searching Authority mailed on Apr. 26, 2012, in related International application No. PCT/US2011/026705, 14 pages.
Mark Miller, Nick Kingsbury and Richard Hobbs, "Seismic Imaging Using Complex Wavelets", IEEE International Conference on Acoustics, Speech, and Signal Processing, XP010790700, Mar. 18-23, 2005, vol. 2, pp. 557-560.
Zhou-Min et al., "Seismic Signal Analysis based on the Dual-Tree Complex Wavelet Packet Transform", Acta Seismologica Sinica, vol. 17, No. S1, XP55021033, Nov. 1, 2004, pp. 117-122.
Taner M.T. et al., "Complex Seismic Trace Analysis", Geophysics, Society of Exploration Geophysicists, US, vol. 44, No. 6, XP02028516, Jun. 1, 1979, pp. 1041-1063.
Ozdogan Yilmaz, "Seismic Data Processing", Society of Exploration of Geophysicists, 1987, Chapter 1, pp. 9-80, Tulsa, Oklahoma, USA.
Ozdogan Yilmaz, "Seismic Data Processing", Society of Exploration of Geophysicists, 1987, Chapter 6, pp. 384-427, Tulsa, Oklahoma, USA.
Z. Yu & D. Whitcombe, "Seismic Noise Attenuation Using 2D Complex Wavelet Transform", H015, 70th EAGE Conference & Exhibition, 5 pages, Leveraging Technology, Rome, Italy, Jun. 9-12 2008.

\* cited by examiner

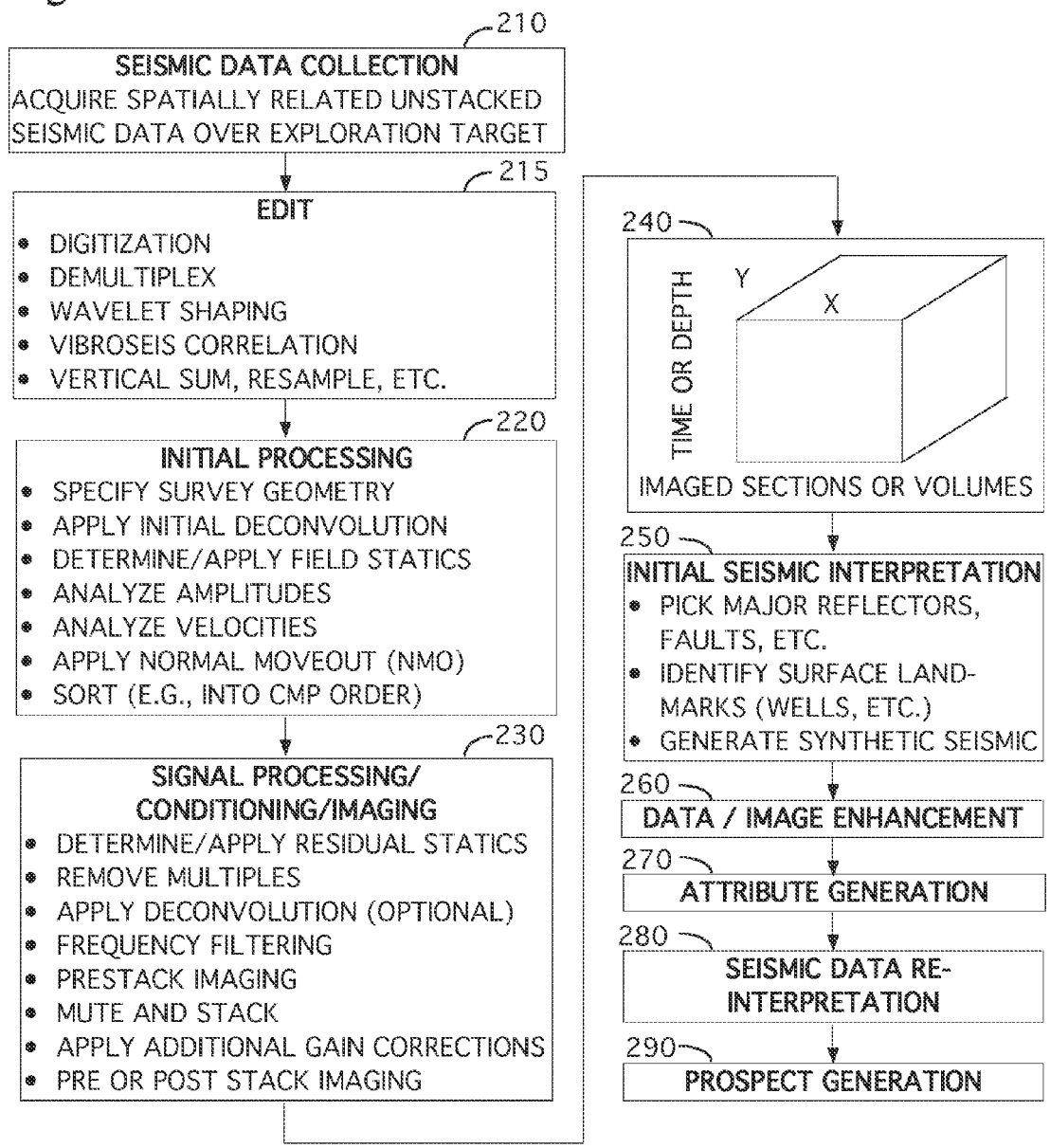

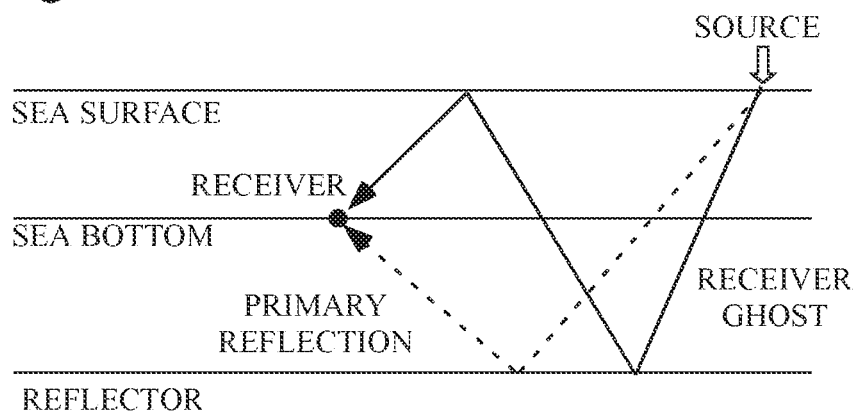
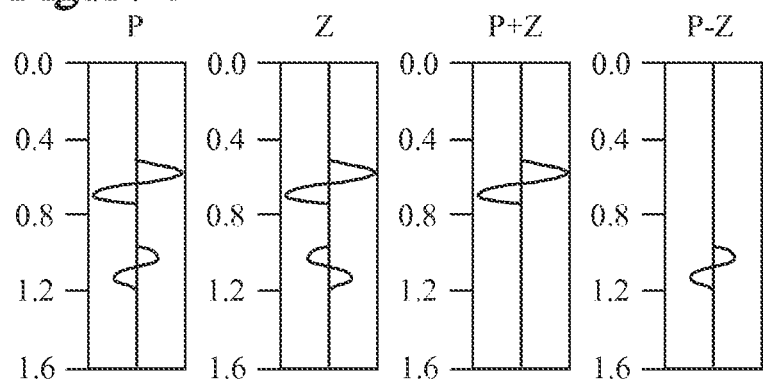

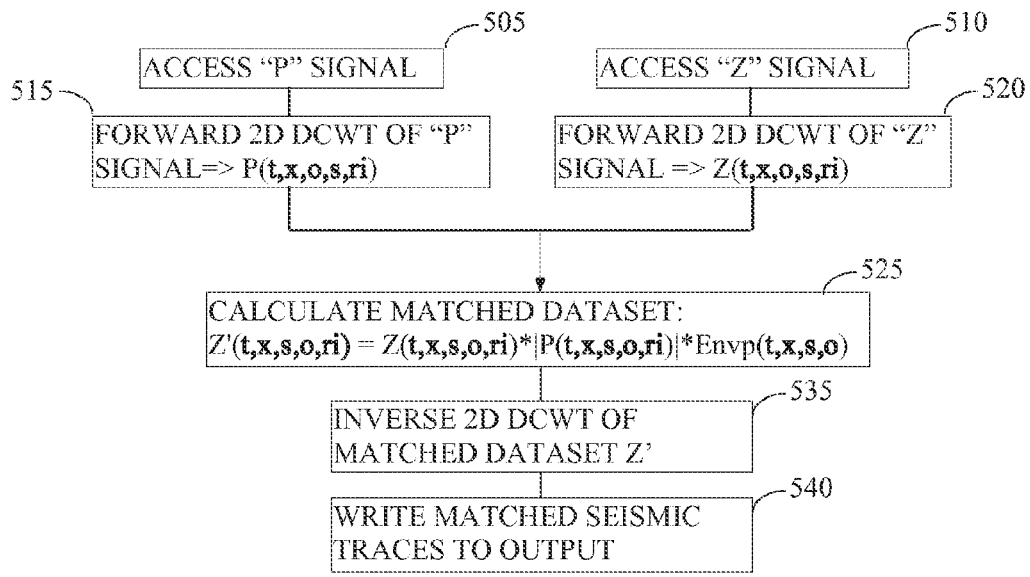
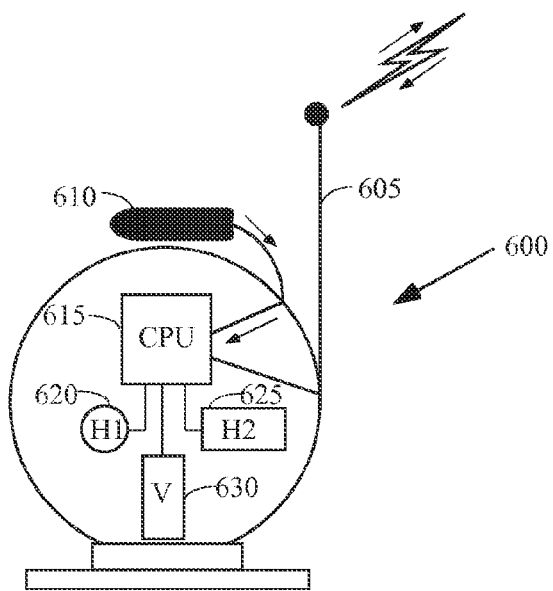

SYSTEM AND METHOD FOR LOCAL ATTRIBUTE MATCHING IN SEISMIC PROCESSING

RELATED CASE

This application claims the benefit of U.S. Provisional Patent Application Ser. No. 61/309,291 filed on Mar. 1, 2010, and incorporates said provisional application by reference into this disclosure as if fully set out at this point.

TECHNICAL FIELD

This invention relates to the general subject of seismic exploration and, in particular, to methods for quantifying and visualizing complex subsurface structures with seismic data.

BACKGROUND OF THE INVENTION

A seismic survey represents an attempt to image or map the subsurface of the earth by sending sound energy down into the ground and recording the "echoes" that return from the rock layers below. The source of the down-going sound energy might come, for example, from explosions or seismic vibrators on land, or air guns in marine environments. During a seismic survey, the energy source is positioned at various locations near the surface of the earth above a geologic structure of interest. Each time the source is activated, it generates a seismic signal that travels downward through the earth, is reflected or transmitted, and, upon its return, is recorded at a great many locations on the surface. Multiple source/recording combinations are then combined to create a near continuous profile of the subsurface that can extend for many miles. In a two-dimensional (2D) seismic survey, the recording locations are generally laid out along a single line, whereas in a three dimensional (3D) survey the recording locations are distributed across the surface, sometimes as a series of closely spaced adjacent two-dimensional lines and in other cases as a grid of source and receiver lines that are arranged to beat some other angle with respect to each other. In simplest terms, a 2D seismic line can be thought of as giving a cross sectional picture (vertical slice) of the earth layers as they exist directly beneath the recording locations. A 3D survey produces a data "cube" or volume that is, at least conceptually, a 3D picture of the subsurface that lies beneath the survey area. In reality, though, both 2D and 3D surveys interrogate some volume of earth lying beneath the area covered by the survey.

A seismic survey is composed of a very large number of individual seismic recordings or traces. In a typical 2D survey, there will usually be several tens of thousands of traces, whereas in a 3D survey the number of individual traces may run into the multiple millions of traces. (Chapter 1, pages 9-89, of *Seismic Data Processing* by Ozdogan Yilmaz, Society of Exploration Geophysicists, 1987, contains general information relating to conventional 2D processing and that disclosure is incorporated herein by reference.) General background information pertaining to 3D data acquisition and processing may be found in Chapter 6, pages 384-427, of Yilmaz, the disclosure of which is also incorporated herein by reference.

A seismic trace is a digital recording of the acoustic energy reflecting from inhomogeneities or discontinuities in the subsurface, a partial reflection occurring each time there is a change in the elastic properties of the subsurface materials. The digital samples are usually acquired at 0.002 second (2 millisecond or "ms") intervals, although 4 milliseconds and 1 millisecond sampling intervals are also common. Each discrete sample in a conventional digital seismic trace is associated with a travel time, and in the case of reflected energy, a two-way travel time from the source to the reflector and back to the surface again, assuming, of course, that the source and receiver are both located on the surface. Many variations of the conventional source-receiver arrangement are used in practice, e.g. VSP (vertical seismic profiles) surveys, ocean bottom surveys, etc. Further, the surface location of every trace in a seismic survey is carefully tracked and is generally made a part of the trace itself (as part of the trace header information). This allows the seismic information contained within the traces to be later correlated with specific surface and subsurface locations, thereby providing a means for posting and contouring seismic data—and attributes extracted therefrom—on a map (i.e., "mapping").

The data in a 3D, survey are amenable to viewing in a number of different ways. First horizontal "constant time slices" may be taken extracted from a stacked or unstacked seismic volume by collecting all of the digital samples that occur at the same travel time. This operation results in a horizontal 2D plane of seismic data. By animating a series of 2D planes it is possible for the interpreter to pan through the volume, giving the impression that successive layers are being stripped away so that the information that lies underneath may be observed. Similarly, a vertical plane of seismic data may be taken at an arbitrary azimuth through the volume by collecting and displaying the seismic traces that lie along a particular line. This operation, in effect, extracts an individual 2D seismic line from within the 3D data volume.

Seismic data that have been properly acquired and processed can provide a wealth of information to the explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of seismic data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

One problem that is frequently encountered in seismic data processing is how best to combine seismic data from two independent datasets that have been collected in the same (or a near-by) area so as to create a unified image of the subsurface. It is of critical importance that seismic data that have similar character from line to line so that subtle signal variations may be tracked consistently across multiple surveys. If the two datasets are collected at the same time using the same equipment, combining the data sets may not be a problem. Differences in the survey source (dynamite, vibrator, air gun, etc.), differences in the type of seismic sensors (geophone, hydrophone, etc.), and differences in the recording instrumentation (e.g., the amplifier type/brand) are among the many factors that can cause the character of one seismic data set to differ markedly from another. In these and many other scenarios, it would be advantageous to process one data set or both through some sort of matching algorithm so that the character of the seismic data is as nearly constant as possible where the surveys intersect.

One instance wherein some degree of character matching would be especially important would be where data that were acquired using geophones is to be combined with data that were obtained using hydrophones. Although this might occur in many circumstances (e.g., a combined land/marine survey) for purposes of specificity in the text that follows this situation will be discussed in the context of a multi-component ocean bottom survey ("OBS", hereinafter). Conventional OBS sensors are readily available that simultaneously record both P and S waves by combining hydrophones and oriented geophones that may be integral to the same physical case. However, comparing and combining data that were obtained via the two types of receivers has proven to be troublesome because of character differences in the signal, noise, etc. In more particular, since the noise level of geophones tends to be higher than that of hydrophones, some sort of matching should be performed if a reliable quality seismic image is to be obtained from the combined data set.

Another instance where matching would be useful would be in the acquisition of 4D seismic data, where the same area is repeatedly surveyed to track the progression of a fluid boundary (e.g., oil/water, oil/gas, etc.) in the survey in a producing field. In this example one goal would be to match the base survey to a subsequent monitoring survey or vice versa. A goal of such a matching would be to enhance the ability to combine and/or compare surveys collected at different times (and possibly with different sources) while maximizing the signal to noise ratio.

Still another example of circumstances when matching could be useful would be in instances where it was desired is to match predicted multiples to true multiples in the seismic data. A good match would make it possible to better suppress the multiples (which are considered noise for standard seismic imaging) which would otherwise tend to obscure the image of the subsurface provided by the data.

Heretofore, as is well known in the seismic processing and seismic interpretation arts, there has been a need for a better method of seismic data matching. Accordingly, it should now be recognized, as was recognized by the present inventor, that there exists, and has existed for some time, a very real need for a method of seismic data processing that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so, because those skilled in the art to which the invention pertains will be able to devise other, forms of this invention within the ambit of the appended claims.

SUMMARY OF THE INVENTION

According to a first preferred aspect of the instant invention, there is provided a system and method for matching two seismic data sets so the seismic data contained therein can be more readily utilized. In the preferred embodiment, an approach which will be referred to herein as "local attribute matching" will be generally implemented in the case of OBS data via the following steps:

(1) Perform a 3D dual-tree complex wavelet transform (DCWT) on both input data sets. For example, the geophone (Z) and hydrophone (P) data could be used for an OBS case, or the base (first) survey data and a subsequent (monitor) survey in a 4D case;
(2) Perform a matching operation on the two transformed data sets in the complex wavelet transform domain. The matching criterion will depend on the nature of the problem that is being addressed; and,
(3) Perform the inverse 3D DCWT on the matched data set to get the processed results.

Note that the instant approach can be adapted to work with a wide range of noise and data types, including noise with substantial amplitude variation. It is also quite efficient as compared with the Radon-based methods that are conventionally utilized. Further, the instant approach implements truly "local" matching since it utilizes a "local" data transformation. Finally, in the more general case where the instant method is to be applied to two different seismic data sets (e.g., two land surveys, a land survey and a marine, survey, etc.) the same approach set out above would work similarly in the equations presented herein, with "Z" and "P"being replaced by, "Z1" and "Z2" respectively, which represent seismic data from the two different surveys that are to be matched (i.e., Z1 will be matched to Z2).

In one preferred embodiment, when the instant method is used with multicomponent OBS data the matching criterion will be that the data in the Z-component that matches the data in the P-component in the 6 dimension local attribute domain is considered to be signal. The remaining energy will then be considered to be noise and will preferably be removed by tapering in the frequency domain using envelope amplitude scaling.

Considering the previous embodiment in greater detail, there is provided herein an embodiment that is designed to be used with an OBS survey collected above a predetermined volume of earth that contains subsurface structural and stratigraphic features conducive to the generation, migration, and accumulation or presence of hydrocarbons. In this embodiment, the OBS data will be comprised of a plurality of P component seismic traces and a plurality of Z component seismic traces. In this embodiment, the OBS survey would be accessed and at least 16 of the plurality of P component seismic traces read. Similarly, at least 16 of the plurality of Z component seismic traces would be read. Next, a forward DCWT transform will be performed on the P component seismic traces to yield a DCWT P transform dataset. Similarly, a DCWT transform will be applied to the Z component seismic traces to produce a DCWT Z transform dataset. Next, the DCWT Z transform dataset will be matched to the DCWT P transform dataset to produce a matched DCWT dataset. The DCWT inverse of the matched DCWT dataset will next be calculated in order to obtain at least 16 matched seismic traces. Finally, the matched seismic traces will be used in seismic exploration for hydrocarbons/within said predetermined volume of the earth.

More generally, and according to another preferred embodiment, a method of geophysical exploration similar to that described above will be employed where, instead of OBS data, the input data consists of two different seismic surveys that have been collected above a subsurface target of interest, each of which surveys has a plurality of seismic traces associated therewith. In this embodiment, a first one of the seismic surveys will be accessed and at least 16 traces will be read from that survey. Next, the instant invention will access a second one of the two seismic surveys and read at least 16 of the seismic traces associated with the second seismic survey. Next, a forward DCWT will be calculated on the at least 16 seismic traces from the first seismic survey, thereby forming a DCWT first dataset. Next, a forward DCWT will be calculated on the data from the second seismic survey, thereby forming a DCWT transformed second dataset. Next, the first DCWT transform dataset will be matched to the second DCWT dataset to produce a matched DCWT dataset. Next, an inverse DCWT will be calculated oh the matched DCWT dataset to produce matched seismic traces. Finally, the matched seismic traces will be used in seismic exploration for subsurface hydrocarbons within said predetermined volume of the earth.

Finally, in still another preferred embodiment, a selected number of input seismic traces may be determined or calculated. The selected number preferably is sufficient to calculate a forward DCWT as described below. In particular, a first seismic survey will be accessed and at least the selected number of seismic traces will be read from a first seismic dataset. Next, a second seismic survey will be accessed and at least the selected number of seismic traces will be read from this dataset. Next, and preferably, a forward DCWT will be calculated using said seismic traces from said first seismic survey, thereby forming a first DCWT dataset. Additionally, a forward DCWT will be calculated from said seismic traces from said second seismic survey, thereby forming a second DCWT dataset. Next, the first DCWT dataset and the second DCWT dataset will be used to produce a matched DCWT dataset. Next, an inverse DCWT will be calculated on the matched DCWT dataset to produce a plurality of matched seismic traces. Finally, and preferably, the matched seismic traces will be used in seismic exploration for hydrocarbons within the predetermined volume of the earth.

A main goal of the instant invention is to enhance the signal and attenuate the noise in one seismic data set by matching its reflection characteristics (e.g., reflector character) to that of another. Further, the instant invention is well suited to application where the goal is to extract similar attributes from related data sets. Additionally, it should be noted that some preferred embodiments utilize a synthetic dataset as the base dataset in order to shape field data to more closely match the character of the synthetic.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Finally, it should be understood that the phraseology and terminology employed herein are for the purpose of description and should not be regarded as limiting, unless the specification specifically so limits the invention.

BRIEF DESCRIPTION OF THE DRAWINGS

Other objects and advantages of the invention will become apparent upon reading the following detailed description and upon reference to the drawings in which:

FIG. 2 contains a seismic processing sequence suitable for use with the instant invention.

FIG. 3 contains a schematic illustration of a typical ray path configuration.

FIG. 4 contains a schematic illustration of the relationship between the P and Z components of a multicomponent recording.

FIG. 5 illustrates a preferred operating logic suitable for use with a 2D implementation of the instant invention.

FIG. 6 contains a schematic illustration of a typical OBS unit.

DETAILED DESCRIPTION

Figure 1:
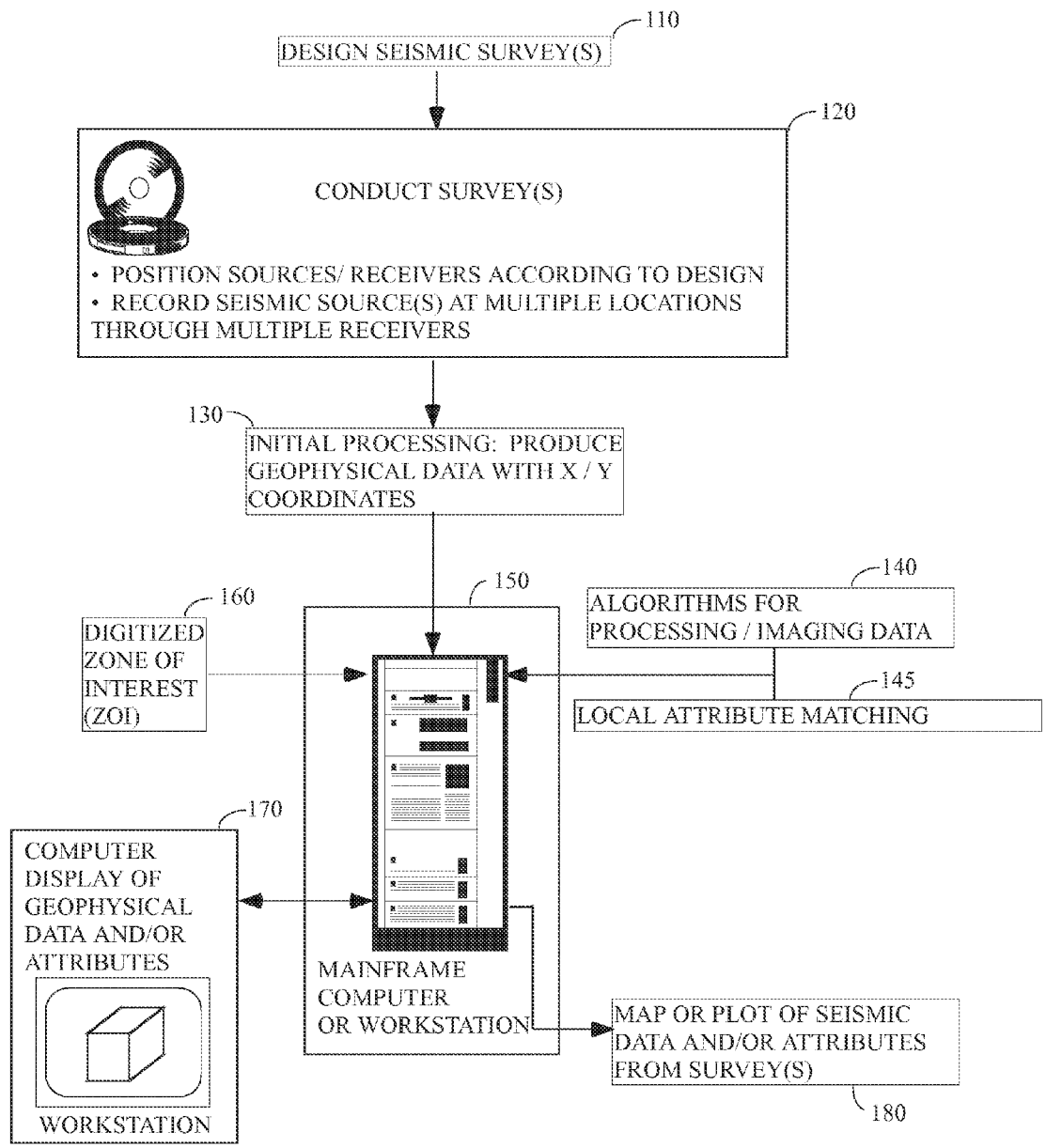
FIG. 1 illustrates a general environment of the instant invention.

While this invention is susceptible of embodiment in many different forms, there is shown in the drawings, and will herein be described hereinafter in detail, some specific embodiments of the instant invention. It should be understood, however, that the present disclosure is to be considered an exemplification of the principles of the invention and is not intended to limit the invention to the specific embodiments or algorithms so described.

General Environment of the Invention

FIG. 1 illustrates the general environment in which the instant invention would typically be used. As a preliminary step 110, it is customary to undertake at least some basic planning of a seismic survey (or surveys) in advance of collecting the data. In addition to determining the location of the survey on the surface of the earth, typically survey-related parameters such as the trace/shot spacing, sample rate, number of recording channels, etc., will also be specified in advance of conducting the survey. Seismic surveys are conducted both onshore and offshore, with geophones typically being used to record the seismic source on land and hydrophones being used in marine environments. Additionally, and depending on the capabilities of the crew that acquires the seismic data, some amount of pre-processing (e.g., demux, source cross-correlation, debubble, etc.) might be performed on-site as the data are acquired (e.g., see step 215 of FIG. 2).

In the field, each receiver (or receiver group) typically gives rise to one seismic trace each time the source is activated and the raw/unprocessed traces are typically written to a mass storage medium (e.g., magnetic tape, optical disk, magnetic disk, etc.) for transmission to the processing center. In the processing center a variety of preparatory processes are typically applied to the seismic traces to prepare them for a wide range of processing and imaging steps that conventionally follow. See steps 215 and 220 of FIG. 2 for some examples of these sorts of processes. The seismic traces (before, during, and after initial processing) might be stored, by way of example only, on hard disk, magnetic tape, magneto-optical disk, DVD disk, or other mass storage means. Note that it is conventional to associate each seismic trace with the position of the receiver (or receiver group) that gave rise to it and this is often done during the preparatory processing.

In the processing center, a variety of signal conditioning and/or imaging steps are typically performed. In the preferred arrangement, these steps will take the form of computer programs 140 that have been loaded onto a general purpose programmable computer 150 where they are accessible by a seismic interpreter or processor. Note that a general purpose computer 150 would typically include, in addition to mainframes, specialized or conventional workstations, and personal computers (PCs), computers that provide for parallel and massively parallel computations, wherein the computational load is distributed between two or more processors. More generally, when the term "computer" is used herein it should be interpreted in its broadest sense to include any programmable device that is capable of performing the tasks described hereinafter.

The instant invention will preferably be loaded (step 145) into such a computer 150 where one or more seismic surveys will be accessed and local attribute matching applied according to the methods discussed herein.

As is further illustrated in FIG. 1, in the preferred arrangement some sort of digitized zone of interest model 160 is often specified by the user and provided as input to the processing computer programs. This zone of interest might correspond to a particular reflector or layer in the subsurface that is believed to trap or contain hydrocarbon resources. In the case of a 3D seismic section, the zone of interest 160 would typically include, specifics as to the lateral extent and thickness (which might be variable and could be measured in time, depth, frequency, etc.) of a subsurface target. The exact means by which such zones are created, picked, digitized, stored, and later read during program execution is unimportant to the instant invention and those of ordinary skill in the art will recognize that this might be done any number of ways.

Seismic processing, programs 140 might be conveyed into the computer that is to execute them by means of, for example, a floppy disk, a magnetic disk, a magnetic tape, a magneto-optical disk, an optical disk, a CD-ROM, a DVD disk, a RAM card, flash RAM, a RAM card, a PROM chip, or loaded over a wired or wireless network. In a typical seismic processing environment, the various numerical treatments that are applied to the seismic, data would be made part of a package of software modules that is designed to perform many of the processing steps listed in FIG. 2. Note that FIG. 2 is intended to represent a generalized processing scheme that, describes in a general way processes that would be suitable for use with either land or marine data. Of course, those of ordinary skill in the art will recognize that land specific data processing steps in FIG. 2 such as vibrator source correlation, surface statics, etc., would not typically be applicable to marine data, as debubble would not typically be used on land data.

Returning to FIG. 1, the processed seismic traces would then typically be sorted into CMP gathers (3-D data will typically be binned into CMPs), stacked, and displayed either at a high-resolution color computer monitor 170 or in hard-copy form as a printed seismic section or a map 180. The seismic interpreter would then use the displayed images to assist him or her in identifying subsurface features conducive to the generation, migration, or accumulation of hydrocarbons.

As was indicated previously, seismic traces that have been acquired according to the instant invention will preferably be subjected to some or all of the processing steps listed in FIG. 2. Those of ordinary skill in the art will recognize that these steps are only broadly representative of the sorts of processes that might be applied to such data and the choice and order of the processing steps, and the particular algorithms involved, may vary markedly depending on the individual seismic processor, the signal source (dynamite, vibrator, air gun, etc.), the survey location (onshore, offshore, combination, etc.), the company that processes the data, etc.

As an initial step a 2D or 3D seismic survey is conducted according to the instant invention over a particular volume of the earth's subsurface (step 210). The data collected in the field consist of unstacked (i.e., unsummed) seismic traces that contain digital information representative of the volume of the earth lying beneath the survey.

After the seismic data are acquired (step 210), they are typically taken from the field to a processing center where some initial or preparatory processing steps are applied to them. Demux, gain recovery, cross correlation, wavelet shaping, bad trace removal, etc., (step 215) are typically applied early in sequence and are designed to place the field seismic records in condition for subsequent processing. That being said, those of ordinary skill in the art will recognize that some or all of the foregoing processes (e.g., demux, cross correlation, initial gain recovery, etc.) might be performed in the field (rather than in a processing center), depending on the processing capability available there. This might be followed by specification of the geometry of the survey (step 220) and storing of a shot/receiver number and a surface location as part of each seismic trace header. Once the geometry has been specified, it is customary to perform a velocity analysis, the resulting velocities being useful in many processing contexts including, by way of example only, time and/or depth imaging.

After the initial pre-stack processing is completed, typically the seismic signal on the unstacked seismic traces will be conditioned before stacked (or summed) data volumes (step 230) are created. In FIG. 2 step 230 contains a typical "Signal Processing/Conditioning/Imaging" processing sequence, but those skilled in the art will recognize that many alternative processes could be used in place of the ones listed in the figure. In any case, the ultimate, goal from the standpoint of the explorationist is the production of a stacked seismic volume or, in the case of 2D data, a stacked seismic line for use in the exploration for hydrocarbons within the subsurface of the earth.

As is suggested in FIG. 2, any digital sample within a stacked seismic volume is uniquely identified by a (X, Y, TIME) triplet, with the X and Y coordinates representing some position on the surface of the earth, and the time coordinate measuring a recorded arrival time within the seismic trace (step 240). For purposes of specificity, it will be assumed that the X direction corresponds to the "in-line" direction, and the Y measurement corresponds to the "cross-line" direction, as the terms "in-line" and "cross-line" are generally understood in the art. Although time is a preferred and most common vertical axis unit, those skilled in the art understand that other units are certainly possible might include, for example, depth or frequency. Additionally, it is well known to those skilled in the art that it is possible to convert seismic traces from brie axis unit (e.g., time) to another (e.g., depth) using standard mathematical conversion techniques.

The explorationist may do an initial interpretation 250 of the resulting stacked volume, wherein he or she locates and identifies the principal reflectors and faults wherever they occur in the data set. This might be followed by additional data enhancement 260 and/or attribute generation (step 270) of the stacked or unstacked seismic data. In many cases the explorationist will revisit his or her original interpretation in light of the additional information obtained from the data enhancement and attribute generation steps (step 280). As a final step, the explorationist will typically use information gleaned from the seismic data together with other sorts of data (magnetic surveys, gravity surveys, LANDSAT data, regional geological studies, well logs, well cores, etc.) to locate subsurface structural or stratigraphic features conducive to the generation, accumulation, or migration of hydrocarbons (i.e., prospect generation 290).

Typically, the instant invention would be implemented as part of any of steps 230, 250, or 260.

Genesis of the Problem

By way of general background, there is a widely observed phenomenon that OBS data recording may be contaminated by noise in the vector component. The noise typically becomes more prevalent when the surrounding water bottom is complex and has small-scale undulations.

There has been extensive study as to the possible causes of this noise. For example, one study has shown that the observed noise in the vector component is most probably generated by the propagation of waves along the sediment-water interface at speeds approaching the shear speed of the sediment. One characteristic of this sort of noise is that it is comprised of surface shear wave energy and can have significant amplitude. Since shear waves do not propagate in water, and also because the surface shear waves have minimal mode conversion to P-waves, this sort of noise is observed on the vector (multi component) geophones and not on the hydrophones.

This scattered energy makes no contribution to the P-wave seismic image. However, such energy is part of the seismic wavefield as perceived by properly configured instrumentation, and therefore such energy will be difficult to filter out by using an instrument design that is robust enough to capture the target seismic information. Thus, the solution to this sort of problem is most likely to be found using after-the-fact seismic processing techniques that address this problem of OBS recording.

Since scattered energy of this sort will tend to travel at a fairly low velocity, the prior art has involved using, for example, F-K type filters. This approach assumes that the dip separation of noise and signal can be achieved using normal moveout ("NMO"). However, such separation is difficult to achieve when the geology is complex. Thus, this method has its limitation.

More recently others have sought to suppress this sort of noise through attribute matching in the 3D tau-P domain and 1D continuous wavelet transform domain. Though the results have been encouraging, there have been issues with aliasing, questions have arisen regarding the invertability of the transform, the speed of the algorithm and space localization of the method have been called into question, etc.

As a consequence, the instant inventors have created a hew method of local attribute matching which takes place in the 3D dual-tree complex wavelet transform (DCWT) domain and which helps overcome the problems of the prior art and, further, offers certain advantages not available via other methods.

Dual Tree Complex Wavelet Transform (DCWT)

According to a preferred embodiment of the invention, a DCWT, also called the dual-tree complex wavelet transform, is used to provide local matching between two datasets. This operation is a complex-valued extension of the discrete wavelet transform (DWT). This approach uses a complex valued wavelet basis function to decompose real signals into real and imaginary parts in the transform domain. The real and imaginary coefficients satisfy the Hilbert relation and are used to compute amplitude and local phase information. The complex wavelet transform has limited redundancy, which is independent of the number of scales (4:1 for 2-D). This gives rise to the property of translation invariance, while using a relatively smaller memory compared to those of the un-decimated forms. Note that, generally speaking, a DWT is not translation invariant which makes it less desirable for use herein.

Another feature of the DCWT that makes it especially well suited for use in connection with the instant invention is that it is a local transform, where "local" is used in the sense of a transform having time limited basis functions. By contrast, Fourier and related transforms have basis functions that, unless truncated, extend to infinity in both directions. Of course, truncation of such functions creates windowing problems well known to those of ordinary skill in the art. Thus, DCWT and other/similar transformations are preferred. Among the other sorts of transformation that might be used include, as examples only, curvelet transforms, ridgelet transforms and shearlet transforms, etc. That being said, note that these transforms are often loosely referred to as discrete wavelet transforms, so, for purposes of the instant disclosure the term DCWT should be broadly construed to include any transform that can be used to calculate a local transform according to the methods discussed herein.

Finally, the run time for a DCWT varies as $4N^2$, which is faster than $(N \log N)^2$ of the 2D FF, assuming an N×N input array. Multi-resolution and localization are met because DWT pyramid decomposition scheme is used in the real and imaginary tree. Since no global transform (such as is the case with Fourier, tau-p, and radon transforms) is involved, the DCWT doesn't spread aliased energy to the extent that the Fourier transform does, even if the input data contains such aliasing.

Preferred Embodiments

According to a first preferred embodiment and as is generally illustrated in FIG. 3, there is provided herein a method of seismic waveform matching that does not suffer from the disadvantages of the prior art. In one preferred embodiment it can be utilized with OBS data to match the character of geophone and hydrophone signals received at each receiver. More generally, the instant invention can be used to match two surveys taken at the same location at different times, two surveys in different areas, etc.

That being said, for purposes of illustration only the technology of the instant invention will be discussed in terms of an OBS example. FIG. 6 contains a schematic illustration of a typical OBS receiver station 600. As is typical, such a device will utilize an antenna 605 of some sort to communicate with (including transmitting data to) the surface of the ocean. The OBS station 600 will typically contain at least one hydrophone 610 that is in fluid communication with the surrounding water. Additionally, two horizontally situated geophones 620 and 625 (which are preferably oriented at right angles to each other) and a vertical geophone 630 will also be provided. The functioning of the station 600 will be controlled by one or more CPUs 615. Note that in this station 600 the location of the geophones 620/625/630 and hydrophone 610 are at the same physical location in the subsurface (i.e., at the same (x,y) coordinate). That feet proves to be a convenience, but not a necessity, in the operation of the instant invention as described below.

According to a preferred aspect of the instant invention, the hydrophone 610 and the vertical-geophone 630 components of the OBS data are preferably combined to separate up- and down-going wavefields. The up-going wavefield is preferably obtained by calculating the weighted sum of these two components (P and Z), and the down-going wavefield as the weighted difference between the two components. This separation process is important for producing an accurate P-wave image of the subsurface. If the components (P and/or Z) are contaminated by noise, then the data produced, by combining them is noisy and therefore unusable for imaging purposes.

Turning next to FIGS. 3 and 4, these figures contain a schematic illustration of a concept that is utilized in the preferred embodiment of the instant invention as it applies to OBS data collection. FIG. 3 illustrates a situation in which a source is activated proximate to the surface or, preferably, hear the surface of a body of water. In the example of this figure, the source is a marine-type source, e.g., an air gun. In FIG. 3, the dashed ray path corresponds to an up-going wavefield as measured at the receiver, whereas the sold wave path is intended to represent a down going ray path.

Continuing with the previous example, FIG. 4 contains a schematic illustration of the recordings of the seismic signals in FIG. 3 as they might appear if they had been recorded by a multi component OBS receiver (i.e., one that records at least the P and Z components of the signal) that had been situated on the sea bottom. Note that since the Z component can sense polarity, it records the sign of the up and down-going wave field, whereas P just measures the scalar component of the wave fields.

Local Attribute Analysis

A seismic attribute is a measurement that is derived from seismic data. Attributes such as dip, azimuth, coherency, instantaneous phase/amplitude, peak-to-trough ratio, etc., have been popular exploration tools in seismic structure visualization and interpretation. It is well known that conventional instantaneous attributes tend to be very noisy and may lead to unphysical values (e.g., negative frequencies). As a consequence, the instant invention utilizes local attributes. Local attributes do not measure signal characteristics instantaneously at each data point, but rather measure them in a local neighborhood around a point. The idea of locality extends from local frequency to other attributes, such as local structural dip in a seismic image.

The occurrence and importance of local variation in seismic data, and the corresponding variation in the attributes calculated from such seismic data, suggests the use of a computational method that has time-frequency and space-wave number localization properties. However, the uncertainty principle states that it is impossible to simultaneously obtain unlimited, resolution in both time and frequency. Thus, conventional local seismic attribute analysis methods, such as a Fourier and iterative inversion based approaches, are limited in view of the aforementioned principal. That is, long Fourier windows are necessary to obtain high resolution but long windows tend to defeat the goal of locality.

On the other hand, the wavelet scale is an optimal (or near optimal) representation of the local frequency or wavenumber as is well known to those of ordinary skill in the art. This observation leads to a consideration of the use of wavelet transforms. In view of the size of the seismic datasets involved, whatever algorithm is used it should have a fast and efficient numerical implementation.

The foregoing are some of the main motivations that argue for an approach such, as DCWT. Additionally, the excellent directionality of the complex wavelet basis function is an additional argument for its use. A detailed discussion of the DCWT in comparison to the other wavelet transforms for use in seismic processing is available in the paper by Yu and Whitcombe (i.e., Yu, Z. and D. Whitcombe, 2008, Seismic noise attenuation using 2D complex wavelet transform. 70th Annual meeting, EAGE, Expanded abstract, H01), the disclosure of which is incorporated herein by reference as if fully set out at this point.

Local Attribute Match Filter

Figure 7:
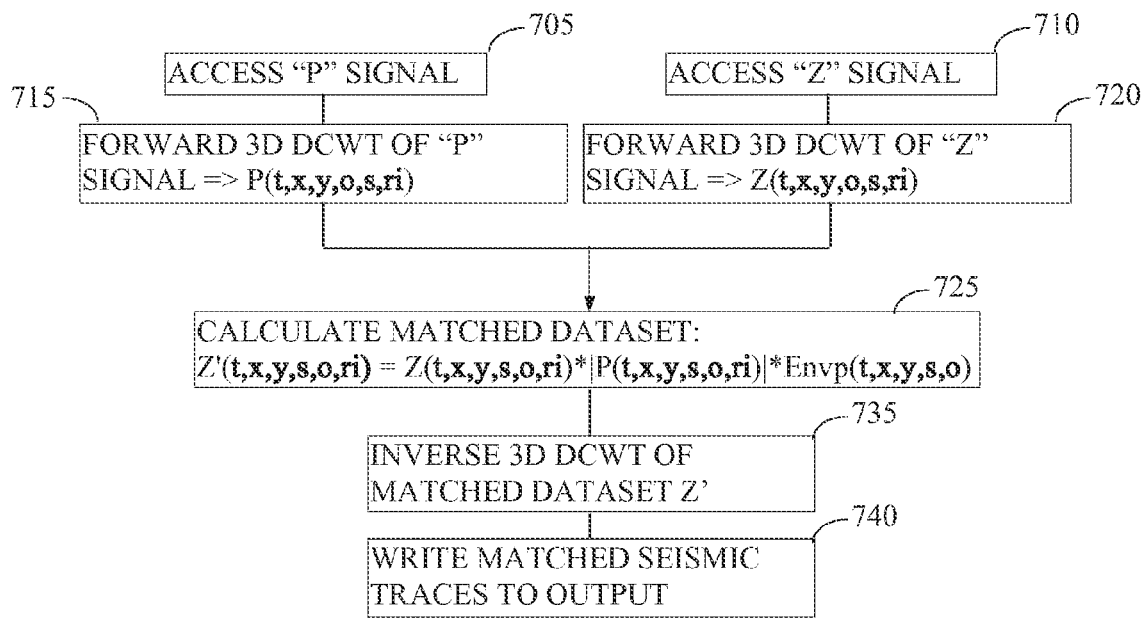
FIG. 7 illustrates a preferred operating logic suitable for use with a 3D
implementation of the instant invention.

Turning now to a detailed discussion of the preferred methodology, a preferred implementation of the instant invention that performs DCWT matching of a 2D (d(t,x)) or 3D (d(t, x, y)) input data set proceeds along the lines set out in FIG. 5 and 7. As is indicated in these figures, the preferred implementation with 2D seismic data (FIG. 5) utilizes a 2D DCWT transformation, whereas the preferred 3D data implementation (FIG. 7) utilizes a 3D DCWT transformation, i.e.,:

$$Z(t,x,y,s,o,ri)=3DCWT(d(t,x,y)),$$

where Z becomes a 6D coefficient array (t, x, y, s, o, ri) after 3D DCWT of the input data d(t,x,y), in which t, x and y are three coordinate vectors respectively, where s is a scale vector, where o is an orientation vector, and where ri is a vector which contains either a real or an imaginary component, depending on the context. In 3D space, the orientation is iso-surface. Populating the orientation vector o with at least 6 elements (e.g., ±75, ±45, ±15 degrees) at each scale for 3D DCWT generally provides good directionality and is preferred. In 3D, this is manifested as oriented planes. The generally smooth variation in amplitude for each orientation provided by this arrangement suggests that the DCWT has the desired translation-invariant property. This property is preferred as a way of minimizing potential processing artifacts, while performing operation on the coefficients. The preferred transformation automatically computes the local dip, local frequency and wavenumber, and local phase, in an adaptive and efficient way. Finally, the smooth variation in amplitudes that have been observed by the instant inventors in connection with computation of the foregoing suggests the DCWT overcomes the checker-board artifacts of the DWT.

FIG. 5 contains, a preferred operating logic suitable for use with a 2D implementation of the instant invention. The 3D implementation (FIG. 7) will be discussed concurrently since the two approaches are closely related. Preferably, and as has been described previously, the instant invention will be applied to OBS data that contains both geophone (Z) and hydrophone (P) signal recordings of the same source. In the preferred arrangement, the matching processing will be done in the local attribute domain, with the final answer being obtained via an inverse transform of the 3D DCWT of the filtered Z-component coefficients.

As first preferred steps 505 and 510 (or, 705 and 710), the instant invention will preferably access a "P" signal and a "Z" signal that record the same source activation at the same location. That preference obviously makes sense for OBS and some 4D data sets. In these cases the data sets that are to be matched potentially have traces that were acquired at the same location, thus they share same (x,y) coordinates. Of course, that statement may be at least somewhat inaccurate in the case of a 4D survey where the subsequent shot and receiver locations differ from the base survey. In those sorts of cases, it would certainly be possible to interpolate or extrapolate from the actual trace data to create two data sets that have common receiver locations. However, more generally that is not actually required and, thus, the instant invention is well adapted to match two data sets that were collected at different locations at different times, to include instances where the two data sets that are compared might only include a portion of the recorded data (e.g., if a single reflector or a limited window in time were the subject of the matching). Thus, in the discussion that follows it will be assumed that some common coordinate system for the two datasets has been determined or created in which the (x,y) coordinates of the matched traces are at least approximately equal.

Next, both data sets will be forward transformed to the DCWT domain according to methods well known to those of ordinary skill in the art (steps 515 and 520 which correspond to steps 715 and 720 for 3D data).

As a text preferred step and continuing with the current OBS example, a matching operation 525 will preferably be performed in the (t,x, s, o, ri) domain (or (t,x,y,o,s,ri) in the 3D domain, step 725). Since in the typical OBS case the hydrophone is considered to be free of scattered shear noise, the Z and P amplitude components will be matched, while preserving the phase of the Z data. One reason that this approach is favored is that it makes it possible to keep track of the original Z signal phase so that the PZ summation and PZ difference can be calculated correctly. For the non-zero coefficients of the transformed dataset Z(t,x,y,s,o,ri) which is based on 3D seismic data, the matching operation in the DCWT domain will be defined as:

$$Z'(t,x,y,s,o,ri) = Z(t,x,y,s,o,ri) * |P(t,x,y,s,o,ri)| * \text{Envp}(t,x,y,s,o),$$

where, $$\text{Envp}(t, x, y, s, o) = \frac{1}{\sqrt{Z(t, x, y, s, o, \text{real})^2 + Z(t, x, y, s, o, \text{imaginary})^2}},$$

and where Z' is the filtered version of Z; Envp is an envelope scaling factor calculated according to the equation presented above; Z and P are the amplitude of 3D DCWT of the geophone data (Z) and the pressure data (P) respectively; and where |P(t, x,y, s, o, ri)| is the absolute value of the coefficient of P (step 725 of FIG. 7). A similar equation is utilized when the data sets are 2D (step 525 of FIG. 5). Of course, if two different land (or marine) surveys are to be matched, the equations become:

$$Z'(t,x,y,s,o,ri) = Z1(t,x,y,s,o,ri) * |Z2(t,x,y,s,o,ri)| * \text{Envp}(t,x,y,s,o),$$

where, $$\text{Envp}(t, x, y, s, o) = \frac{1}{\sqrt{Z1(t, x, y, s, o, \text{real})^2 + Z1(t, x, y, s, o, \text{imaginary})^2}},$$

where Z1(•) represents traces from the first survey that are to be matched to traces from the second survey, Z2(•).

It should be noted that the equation that defines Z'(t,x,y,s,o,ri) above is actually a loop over 6 dimensions (t, x, y, s, o, ri) for each coefficient. The operation represented by the equations above will be different if a different transform and/or weight function (Envp(•)) are used.

Finally, in the preferred embodiment the matched dataset in the DCWT domain will be inverse DCWT filtered (steps 535 and 735) and written to output (steps 540 and 740), thereby producing a matched seismic dataset.

In an embodiment, a specific number of seismic traces are selected or determined which will be read to be used as input to the DCWT operation (e.g. a selected number of traces). Preferably, at least 16 traces are read from each seismic dataset. This is because each scale factor choice creates a down sampling by a factor of 2 and, preferably, at last two different scale factors, will be used. That being said, those of ordinary skill in the art will recognize that choosing the determined number of seismic traces that are to be used as input is a design decision that is well within the abilities of one of ordinary skill in the art to make. Thus, in the text that follows it will be understood that the number of traces that are to be processed via the instant method will be chosen such that there are at least enough traces to allow computation of the associated DCWT, whatever that number of traces might be.

As is indicated above, the previous equations apply with equal validity to non-OBS data. In the case where the data that are to be matched originate from different seismic surveys (to include both land and/or marine surveys), the previous equation can be modified by replacing the "P" data with geophone or hydrophone data from the other survey as is shown supra. In a case where the data are collected from completely different locations, an arbitrary matching between traces in the different surveys can be established and the instant equation calculated as indicated.

With respect to the choice of a particular wavelet/basis function suitable for use with the instant invention, there are many wavelets that could potentially be used. That being said, in the preferred embodiment the wavelet chosen for use in the transform should (a) yield a completely invertible transformation (e.g., the basis functions must overlap in the frequency and wave number domains so that the aliased portions of the signal cancel during the inverse transform computation); (b) be analytic (i.e., its frequency response should be at least approximately single sided); (c) have a phase that is at least approximately linear; (d) be orthogonal (i.e., yield an orthogonal or orthonormal basis); and, (e) satisfy the Hilbert transform pair condition. Based on these criteria, those of ordinary skill in the art will be able to select from numerous wavelets to choose one that gives acceptable results for a particular set of seismic data.

Further, in the preferred embodiment the wavelet scale (as that term is known and understood by those of ordinary skill in the art) will be chosen to be 3 or 4. Of course, these are just suggested values and any number of alternative values might possible be used instead, depending on the circumstances. Those of ordinary skill in the art will readily be able to select values for this parameter depending on the circumstances.

Once the data have been matched they will then be much more useful in seismic exploration. For example, where land seismic and marine seismic have been matched, a subtle reflector variation that has been identified in the land data will more likely be recognizable and, hence, can be followed, when in an adjacent marine survey.

Although the invention disclosed herein was largely discussed in terms of seismic traces from OBS systems, that was done for purposes of specificity only and not out of any intent to limit the instant invention to operation on only that sort of data, Within the text of this disclosure, the terms seismic trace and seismic gather are intended to be used in the broadest possible sense, and they are meant to apply to conventional 2D and 3D traces and CMP gathers, as well as to other sorts of gathers which might include, without limitation, CRP gathers, CCP gathers (i.e., "common conversion point" gathers), CACP ("common asymptotic conversion point") gathers, common offset gathers, common shot/receiver gathers, etc., the most important aspect of a "gather" being that it represents an a collection of unstacked seismic traces from either a 2D or 3D survey organized according to some field or other parameter.

Further, the instant invention is equally applicable to stacked and unstacked seismic data, although using unstacked data typically will produce better results.

Although the instant disclosure has focused on the use of DCWT those of ordinary skill in the art will recognize, that other local transformations might be used instead. For example, a ridgelet transform, a curvelet transform, a beamlet transform and any multi-dimensional local transform might be used instead of the DCWT discussed herein. For purposes of the claims that follow, the term DCWT is to be broadly understood to include each of the foregoing.

Although the DCWT is the preferred method of implementing the instant invention, other non-dual tree CWTs (e.g., real complex wavelet transforms, etc.) could also be used.

Finally, in the previous discussion, the language has been expressed in terms of processing operations performed on conventional seismic data. But, it is understood by those skilled in the art that the invention herein described could be applied advantageously in other subject matter areas, and used to locate other subsurface minerals besides hydrocarbons. By way of example only, the same approach described herein could potentially be used to process and/or analyze multi-component seismic data, shear wave data, converted mode data, cross well survey data, full waveform sonic logs, ground penetrating radar, CSEM (controlled source electromagnetic data)/t-CSEM (transient controlled source electromagnetic data), any acquisition technique that records wave field data, or model-based digital simulations of any of the foregoing. Additionally, the methods claimed herein after can be applied to mathematically transformed versions of these same data traces including, for example: filtered data traces, migrated data traces, frequency domain Fourier transformed data traces; transformations by discrete orthonormal transforms; instantaneous phase data traces, instantaneous frequency data traces, quadrature traces, analytic traces; etc. In short, the process disclosed herein can potentially be applied to a wide variety of types of geophysical time series, but it is preferably applied to a collection of spatially related time series. Thus, when the term "seismic data" is used here, that term should be broadly construed to potentially include data collected from any of the foregoing sources and/or combinations of same.

While the inventive device has been described and illustrated herein by reference to. certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of geophysical exploration, wherein is provided an ocean bottom survey containing a plurality of hydrophone component seismic traces and a plurality of geophone component seismic traces, the method comprising the steps of:
   a. accessing said ocean bottom survey;
   b. reading at least sixteen of said plurality of hydrophone component seismic traces;
   c. reading at least sixteen of said plurality of geophone component seismic traces;
   d. calculating a forward complex wavelet transform on said read at least sixteen hydrophone component seismic traces, thereby forming a complex wavelet transform pressure dataset;
   e. calculating a forward complex wavelet transform on said read at least sixteen geophone component seismic traces, thereby forming a complex wavelet transform geophone dataset;
   f. matching, including a local attribute matching, said complex wavelet transform geophone dataset to said complex wavelet transform hydrophone dataset to produce a matched complex wavelet transform dataset by calculating the quantity $$Z'(t,x,y,s,o,ri)=Z(t,x,y,s,o,ri)*|P(t,x,y,s,o,ri)|*\text{Envp}(t,x,y,s,o),$$

where $\text{Envp}(t,x,y,s,o)$ is an envelope scaling factor determined by, $$\text{Envp}(t, x, y, s, o) = \frac{1}{\sqrt{Z(t, x, y, s, o, \text{real})^2 + Z(t, x, y, s, o, \text{imaginary})^2}},$$

and where
   $Z'(t,x,y,s,o,ri)$ is said matched complex wavelet transform dataset,
   $Z(t,x,y,s,o,ri)$ is said complex wavelet transform Z dataset,
   $P(t,x,y,s,o,ri)$ said complex wavelet transform P dataset,
   t is time,
   x is an X coordinate vector associated with said at least sixteen geophone component traces,
   y is a Y coordinate vector associated with said at least sixteen geophone component traces,
   o is an orientation vector,
   s is a scale vector, and,
   ri is a vector that contains either a real component or an imaginary component depending on the context;
   g. calculating an inverse complex wavelet transform on said complex wavelet transform dataset to produce at least sixteen matched seismic traces;
   h. obtaining a matched seismic image using the at least sixteen matched seismic traces, the matched seismic image having a signal-to-noise ratio that is greater than a signal-to-noise ratio of a second seismic image obtained using said at least sixteen of said plurality of geophone component seismic traces, wherein the matched seismic image is representative of a subsurface of the earth and,
   i. using said at least sixteen matched seismic traces to locate a drilling site in the subsurface of the earth for seismic exploration for subsurface hydrocarbons.

2. The method of geophysical exploration according to claim 1, wherein said forward complex wavelet transform comprises a forward 3D complex wavelet transform and said inverse complex wavelet transform comprises an inverse 3D complex wavelet transform.

3. The method of geophysical exploration according to claim 1, wherein said orientation vector has six elements comprising 75 degrees, 45 degrees, 15 degrees, −75 degrees, −45 degrees, and −15 degrees.

4. A method of geophysical exploration within a predetermined volume of the earth containing subsurface structural and stratigraphic features conducive to the generation, migration, accumulation, or presence of hydrocarbons, wherein is provided two sets of seismic traces, one a set of hydrophone traces and the other a set of geophone traces seismic surveys each having a plurality of seismic traces associated therewith, the method comprising the steps of:

a. determining a selected number of input traces to read;
b. accessing a first of said two sets of seismic traces;
c. reading at least said selected number of input traces from said first set of seismic traces;
d. accessing a second of said two sets of seismic traces;
e. reading at least said selected number of input traces from said second set of seismic traces;
f. calculating a forward complex wavelet transform on said read input traces from said first set of seismic traces, thereby forming a first complex wavelet transform dataset;
g. calculating a forward complex wavelet transform on said read input traces from said second set of seismic traces survey, thereby forming a second complex wavelet transform dataset;
h. matching said first complex wavelet transform dataset to said second complex wavelet transform dataset to produce a matched complex wavelet transform dataset, the matching including a local attribute matching, by calculating the quantity $$Z'(t,x,y,s,o,ri)=Z(t,x,y,s,o,ri)*|P(t,x,y,s,o,ri)|*\text{Envp}(t,x,y,s,o),$$

where Envp(t,x,y,s,o) is an envelope scaling factor determined by, $$\text{Envp}(t, x, y, s, o) = \frac{1}{\sqrt{Z(t, x, y, s, o, \text{real})^2 + Z(t, x, y, s, o, \text{imaginary})^2}},$$

and where
Z'(t,x,y,s,o,ri) is said matched complex wavelet transform dataset,
Z (t,x,y,s,o,ri) is said complex wavelet transform Z dataset,
P(t,x,y,s,o,ri) is said complex wavelet transform P dataset,
t is time,
x is an X coordinate vector associated with said at least sixteen geophone component traces,
y is a Y coordinate vector associated with said at least sixteen geophone component traces,
o is an orientation vector,
s is a scale vector, and,
ri is a vector that contains either a real component or an imaginary component depending on the context;

i. calculating an inverse complex wavelet transform on said matched complex wavelet transform dataset to produce a plurality of matched seismic traces;
j. obtaining a matched seismic image using the plurality of matched traces, the matched seismic image having a signal-to-noise ratio that is greater than a signal-to-noise ratio of a second seismic image obtained using the set of geophone traces, wherein the matched seismic image is representative of a subsurface of the earth and,
k. using said matched seismic traces to locate a drilling site in the subsurface of the earth for seismic exploration for subsurface hydrocarbons.

5. The method according to claim 4, wherein said s number of input traces to read is 16 input traces to read.

6. The method according to claim 4, wherein
said forward complex wavelet transform is a forward curvelet transform or a forward shearlet transform, and,
said inverse complex wavelet transform is an inverse curvelet transform or an inverse shearlet transform.

7. The method according to claim 4, wherein said selected number of input traces to read is a number of input traces sufficient to calculate said forward complex wavelet transform of step (f).

8. A method for use in geophysical exploration, comprising:
accessing a seismic data set including hydrophone traces and geophone traces;
performing a complex wavelet transform on the hydrophone traces and the geophone traces;
matching the complex wavelet transformed hydrophone traces and the transformed geophone traces, the matching including a local attribute matching, by calculating the quantity $$Z'(t,x,y,s,o,ri)=Z(t,x,y,s,o,ri)*|P(t,x,y,s,o,ri)|*\text{Envp}(t,x,y,s,o),$$

where Envp(t,x,y,s,o) is an envelope scaling factor determined by, $$\text{Envp}(t, x, y, s, o) = \frac{1}{\sqrt{Z(t, x, y, s, o, \text{real})^2 + Z(t, x, y, s, o, \text{imaginary})^2}},$$

and where
Z'(t,x,y,s,o,ri) is said matched complex wavelet transform dataset,
Z(t,x,y,s,ca,ri) is said complex wavelet transform Z dataset,
P(t,x,y,s,o,ri) is said complex wavelet transform P dataset,
t is time,
x is an X coordinate vector associated with said at least sixteen geophone component traces,
y is a Y coordinate vector associated with said at least sixteen geophone component traces,
o is an orientation vector,
s is a scale vector, and,
ri is a vector that contains either a real component or an imaginary component depending on the context;
performing an inverse complex wavelet transform on the matched hydrophone and geophone traces to obtain the processed seismic data,
obtaining a matched seismic image using the processed seismic data, the matched seismic image having a signal-to-noise ratio that is greater than a signal-to-noise ratio of a second seismic image obtained using the geophone traces, wherein the matched seismic image is representative of a subsurface of the earth; and
using said matched seismic traces to locate a drilling site in the subsurface of the earth for seismic exploration for subsurface hydrocarbons.

9. The method of claim 8, wherein matching the complex wavelet transformed hydrophone traces and the transformed geophone traces further comprises determining that the data in the geophone seismic traces matches the data in the hydrophone component in a six dimension local attribute domain.

10. The method of claim 8, wherein unmatched data is considered to be noise and is removed.

11. The method of claim 10, wherein the noise is removed by tapering in the frequency domain.

12. The method of claim 11, wherein tapering in the frequency domain includes using envelope amplitude scaling.

13. The method of claim 8, wherein matching the transformed hydrophone traces and the transformed geophone traces includes matching the amplitude components of the geophone and hydrophone traces while preserving the phase of the data in the geophone traces.

14. The method of claim 8, wherein the complex wavelet transform is a dual-tree complex wavelet transform, a curvelet transform, or a shearlet transform.

15. The method of claim 14, wherein the inverse complex wavelet transform is a dual-tree complex wavelet transform, a curvelet transform, or a shearlet transform.

16. The method of claim 8, wherein the inverse complex wavelet transform is a dual-tree complex wavelet transform, a curvelet transform, or a forward shearlet transform.

17. A computer programmed to perform a method for use in geophysical exploration, the computer comprising:
a processor;
a set of seismic data set including hydrophone traces and geophone traces; and
a plurality of seismic processing programs that, when executed by the processor, perform a method comprising:
accessing the seismic data set;
performing a complex wavelet transform on the hydrophone traces and the geophone traces;
matching the complex wavelet transformed hydrophone traces and the transformed geophone traces, the matching including a local attribute matching, by calculating the quantity $$Z'(t,x,y,s,o,ri)=Z(t,x,y,s,o,ri)*|P(t,x,y,s,o,ri)|*\text{Envp}(t,x,y,s,o),$$

where Envp(t,x,y,s,o) is an envelope scaling factor determined by, $$Envp(t, x, y, s, o) = \frac{1}{\sqrt{Z(t, x, y, s, o, \text{real})^2 + Z(t, x, y, s, o, \text{imaginary})^2}},$$

and where
$Z'(t,x,y,s,o,ri)$ is said matched complex wavelet transform dataset,
$Z(t,x,y,s,o,ri)$ is said complex wavelet transform Z dataset,
$P(t,x,y,s,o,ri)$ is said complex wavelet transform P dataset,
t is time,
x is an X coordinate vector associated with said at least sixteen geophone component traces,
y is a Y coordinate vector associated with said at least sixteen geophone component traces,
o is an orientation vector,
s is a scale vector, and,
ri is a vector that contains either a real component or an imaginary component depending on the context;

performing an inverse complex wavelet transform on the matched hydrophone and geophone traces to obtain the processed seismic data;
obtaining a matched seismic image using the processed seismic data, the matched seismic image having a signal-to-noise ratio that is greater than a signal-to-noise ratio of a second seismic image obtained using the geophone traces, wherein the matched seismic image is representative of a subsurface of the earth; and
using said matched seismic traces to locate a drilling site in the subsurface of the earth for seismic exploration for subsurface hydrocarbons.

18. The computer of claim 17, wherein matching the complex wavelet transformed hydrophone traces and the transformed geophone traces further comprises determining that the data in the geophone seismic traces matches the data in the hydrophone component in a six dimension local attribute domain.

19. The computer of claim 17, wherein unmatched data is considered to be noise and is removed by tapering in the frequency domain using envelope amplitude scaling.

20. The computer of claim 17, wherein matching the transformed hydrophone traces and the transformed geophone traces includes matching the amplitude components of the geophone and hydrophone traces while preserving the phase of the data in the geophone traces.

21. The computer of claim 17, wherein the complex wavelet transform is a dual-tree complex wavelet transform, a curvelet transform, or a shearlet transform.

22. The computer of claim 17, wherein the inverse complex wavelet transform is a dual-tree complex wavelet transform, a curvelet transform, or a forward shearlet transform.

23. The computer of claim 17, wherein the processor comprises a seismic processor.

24. The computer of claim 17, wherein the processor comprises a seismic interpreter.

25. A non-transitory program storage medium encoded with instructions that, when executed by a processor, perform a method for use in geophysical exploration, the method comprising:
accessing a seismic data set;
performing a complex wavelet transform on the hydrophone traces and the geophone traces;
matching the complex wavelet transformed hydrophone traces and the transformed geophone traces, the matching including a local attribute matching, by calculating the quantity $$Z'(t,x,y,s,o,ri)=Z(t,x,y,s,o,ri)*|P(t,x,y,s,o,ri)|*\text{Envp}(t,x,y,s,o),$$

where Envp(t,x,y,s,o) is an envelope scaling factor determined by, $$Envp(t, x, y, s, o) = \frac{1}{\sqrt{Z(t, x, y, s, o, \text{real})^2 + Z(t, x, y, s, o, \text{imaginary})^2}},$$

and where
$Z'(t,x,y,s,o,ri)$ is said matched complex wavelet transform dataset,
$Z(t,x,y,s,o,ri)$ is said complex wavelet transform Z dataset,
$P(t,x,y,s,o,ri)$ is said complex wavelet transform P dataset, t is time, x is an X coordinate vector associated with said at least sixteen geophone component traces, y is a Y coordinate vector associated with said at least sixteen geophone component traces, o is an orientation vector, s is a scale vector, and, ri is a vector that contains either a real component or an imaginary component depending on the context;

performing an inverse complex wavelet transform on the matched hydrophone and geophone traces to obtain the processed seismic data;

obtaining a matched seismic image using the processed seismic data, the matched seismic image having a signal-to-noise ratio that is greater than a signal-to-noise ratio of a second seismic image obtained using the geophone traces, wherein the matched seismic image is representative of a subsurface of the earth; and using said matched seismic traces to locate a drilling site in the subsurface of the earth for seismic exploration for subsurface hydrocarbons.

26. The program storage medium of claim 25, wherein matching the complex wavelet transformed hydrophone traces and the transformed geophone traces further comprises determining that the data in the geophone seismic traces matches the data in the hydrophone component in a six dimension local attribute domain.

27. The program storage medium of claim 25, wherein unmatched data is considered to be noise and is removed by tapering in the frequency domain using envelope amplitude scaling.

28. The program storage medium of claim 25, wherein matching the transformed hydrophone traces and the transformed geophone traces includes matching the amplitude components of the geophone and hydrophone traces while preserving the phase of the data in the geophone traces.

29. The program storage medium of claim 25, wherein the complex wavelet transform is a dual-tree complex wavelet transform, a curvelet transform, or a shearlet transform.

30. The program storage medium of claim 25, wherein the inverse complex wavelet transform is a dual-tree complex wavelet transform, a curvelet transform, or a shearlet transform.

* * * * *